Patented Aug. 28, 1928.

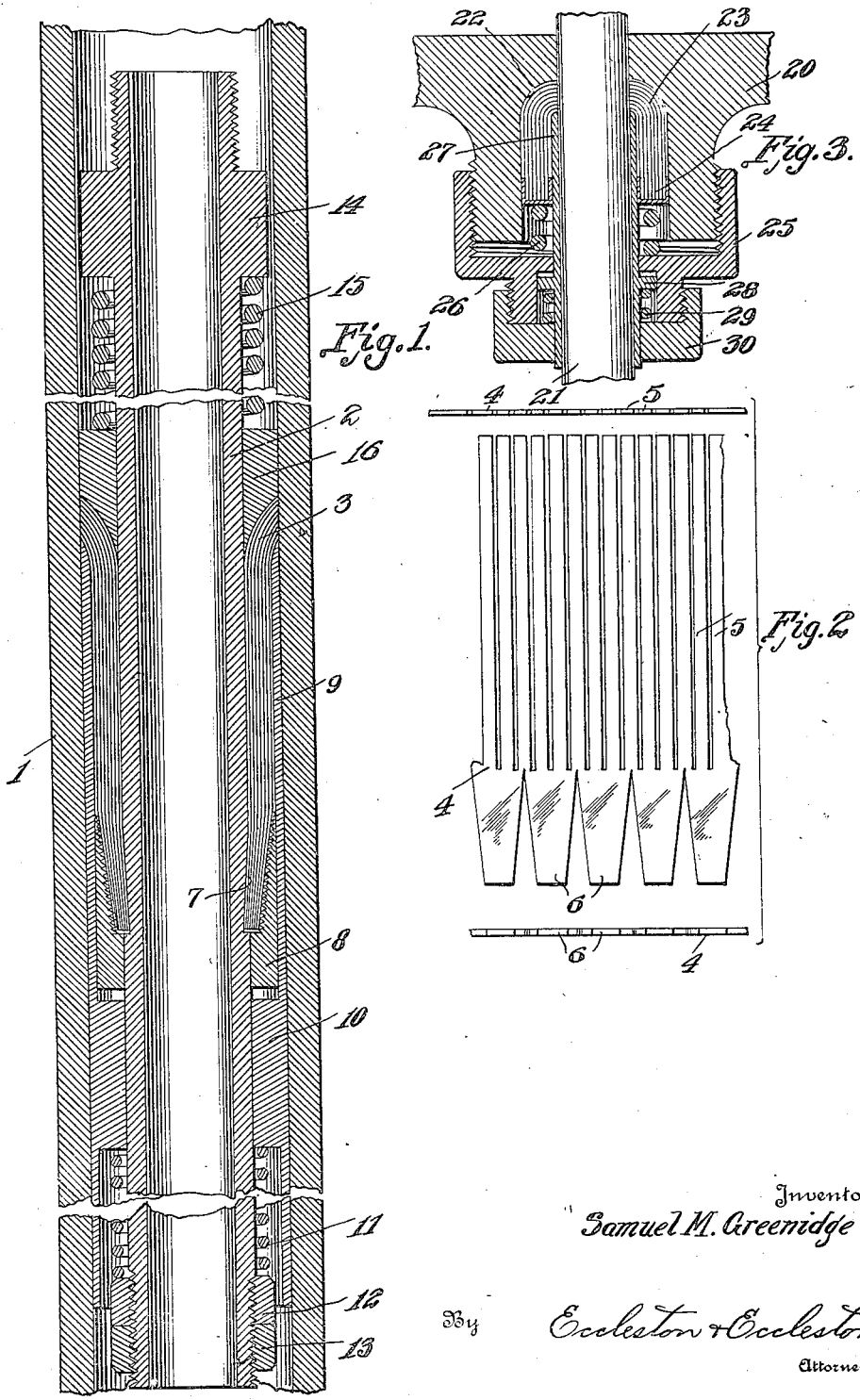

1,682,222

UNITED STATES PATENT OFFICE.

SAMUEL M. GREENIDGE, OF DALLAS, TEXAS.

PACKING FOR PISTONS AND THE LIKE.

Application filed May 6, 1926. Serial No. 107,293.

This invention relates to packing structures for pistons of pumps or engines, as well as for rod packings where the rods have either a reciprocating or a rotary movement.

An object of the invention is to provide a packing which will have a constant and regular contact with the part of the mechanism against which it operates and also be maintained in compact form thereby, ensuring a leakproof engagement between the parts.

Another object of the invention resides in a construction by which the packing may be automtaically fed forward so as to always maintain a tight fit between the operating parts irrespective of wear on these parts, or on the packing from any of the well known causes.

Other objects and advantages of the invention will be apparent from the following description when taken in connection with the accompanying drawings; in which Figure 1 is a longitudinal section through an apparatus in which the present invention is incorporated.

Figure 2 is a detail of one of the elements of the packing showing a plan and two opposite end views thereof; and, Figure 3 is a longitudinal section through a modified form of the invention.

Referring to the drawings in greater detail the numeral 1 indicates the pump cylinder or the like in which is mounted for reciprocation the piston rod 2 illustrated in the present instance as hollow although the invention is of course, equally well adapted to a solid piston rod.

The packing for the piston is formed of a plurality of layers of material designated generally by the numeral 3 (Fig. 1) but is shown in detail in Figure 2. This packing is formed from sheet material preferably sheet metal, although fiber, asbestos, rubber, leather or other flexible material with or without layers of metal may be employed. One of the sheets forming a layer of the packing is indicated by numeral 4 and is slitted to provide a plurality of elongated fingers 5 and is also notched to provide a plurality of tapered tongues 6.

The piston rod 2 may be provided with an annular recess 7 for the reception of the tongues 6 when the layers 4 are stacked together and applied to the rod in cylindrical form. These tongues 6 are jammed into the recess 7 by means of a nut 8 provided with tapered threads as clearly shown in Figure 1 and serves to anchor the packing to the rod as well as to prevent the escape of fluids thereby; the elongated fingers 5, of course, permitting the packing to be flexed in the manner shown in Fig. 1. It will be understood however, that the invention is not limited to the specific manner of attaching the packing to the rod.

Disposed between the inner wall of the cylinder 1 and the nut 8 is a cylindrical sleeve 9 provided with an inwardly extending enlargement 10, integral or otherwise, at a point below nut 8 and biased toward the nut by a coil spring 11. This spring has one end in engagement with the enlargement 10 and its opposite end is supported on the nuts 12—13 threaded to the rod 2. From an inspection of Figure 1 it will be apparent that the sleeve 9 functions to support and protect the main body of the packing 3 as well as to compact the operative end thereof and to guide this end against the cylinder wall as hereinafter described.

Above the packing 3 the rod 2 is formed with a shoulder 14, integral or otherwise, which forms a seat for a spring 15. The opposite end of this spring engages a ring 16 having its end next the spring square to act as a seat for the spring, and its end next the packing 3 wedge-shaped for engagement with the operative end of the packing 3. The contour of the wedge-shaped portion of the ring is such as to direct the operative end of the packing, i. e., the fingers 5, against the wall of the cylinder and against the end of the sleeve 9 which compacts the operating end of the packing.

It should be here noted that the spring 15 is stronger than the spring 11 and that therefore as the exposed end of the packing or the wall of the cylinder wears away the packing will be fed outwardly through the space between the member 16 and the edge of the sleeve 9. This action is due to the fact that the superior pressure of spring 15 will force the sleeve 9 downwardly automatically as the parts wear away and thereby causes the flexed end of the packing to press against the cylinder wall. Obviously, therefore, the packing will be continuously and automatically fed forward against the cylinder wall until the operative portion of the packing reaches the nut 8, or until the spring 15 is extended to such point that its pressure is equal to that of spring 11. Furthermore, the weaker spring 11 will serve to maintain the end of the packing compacted at all times.

The invention just described is of course readily adaptable to pumps of many types, engine pistons and also as a stuffing box for piston rods of both the reciprocating and rotary type. An illustration of a stuffing box embodying the novel features of the invention is depicted in Figure 3.

In this latter form of the invention the numeral 20 indicates the cylinder or pump head through which extends the rod 21. The head 20 is of course, pocketed as designated by numeral 22 for the reception of the packing element 23 which is composed of a plurality of slitted layers of material such as shown in Figure 2 except that the tongues 6 are unnecessary inasmuch as the end of the packing is not seated in a groove or recess as in the form first described. In this present form the layers of packing material may be soldered or otherwise secured together at their lower ends as indicated by numeral 24.

A cap 25 is detachably connected to the head 20 by means of threads or the like, and this cap forms a seat for the coil spring 26 which serves to feed the packing 23 inwardly. Slidably mounted in the cap 25 and extending between the rod 21 and the major part of the packing 23 is a sleeve 27 similar to sleeve 9 of Figure 1. This sleeve 27 is provided with a flange 28 which forms a seat for spring 29 which has its other end in engagement with the gland nut 30. As in the form of the invention earlier described the spring 26 is more powerful than the spring 29 and therefore functions to force the packing 23 forwardly against the rod 21 despite the action of spring 29 upon the sleeve 27 which serves not only to protect the inner part of the packing from the rod 21 but also to guide and compact the packing at the point at which it contacts the rod. In this form of the invention also it will be apparent that the packing is continuously and automatically fed against the rod as either or both rod and packing wear away.

From the foregoing description taken in connection with the accompanying drawing it will be apparent that I have devised a novel type of packing and feeding means therefor by which a tight fit may always be maintained irrespective of wear between the moving parts of the mechanism with which the packing is incorporated or of wear upon the packing itself, irrespective of whether the wear is due to abrasive materials or acids in the liquids, or to gases passing through the pump or to other causes.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In combination with pistons for motors, pumps and the like, a substantially cylindrical packing element having one of its circular edges in contact with a relatively moving part of the mechanism, a spring for pressing the edge of the packing against the moving part, a sleeve interposed between a major portion of the said packing and the moving part of the mechanism, and a weaker spring pressing an edge of said sleeve against the edge of the packing.

2. In a mechanism having relatively movable parts, a substantially cylindrical packing element, means for anchoring one end of said element to one of said parts, and means including oppositely disposed springs of unequal strength for feeding and guiding the other end of said element against the other of said parts.

3. In a mechanism having relatively movable parts, an elongated packing element of substantially cylindrical form, means for securing one end of said packing to one of said parts, a spring-pressed sleeve encircling and in engagement with the outer wall of said packing element and serving as a support and guide for the opposite end of said element, a wedge-shaped member for engagement with the unsecured end of said packing element and a portion of the inner wall thereof, and a spring of greater strength than said first-mentioned spring for forcing said wedge-shaped member towards said sleeve.

4. In a mechanism having relatively movable parts, an elongated packing element of substantially cylindrical form having one end secured to one of said elements and its other end turned outwardly into engagement with the other element, a spring-pressed sleeve encircling and in engagement with the outer wall of said packing element and serving as a support and guide for the unsecured end of the packing element, a wedge-shaped member for engagement with the out-turned end of said packing element, and a spring of greater strength than said first-mentioned spring for forcing said wedge-shaped member towards said sleeve.

SAMUEL M. GREENIDGE.